Feb. 26, 1952 M. NEIKIRK 2,587,510

DISK CARRIER ATTACHMENT

Filed June 28, 1949 3 Sheets-Sheet 1

INVENTOR.

Marvin Neikirk,

BY Victor J. Evans & Co.

ATTORNEYS

Feb. 26, 1952 M. NEIKIRK 2,587,510

DISK CARRIER ATTACHMENT

Filed June 28, 1949 3 Sheets-Sheet 2

INVENTOR.

Marvin Neikirk,

BY Victor J. Evans & Co.

ATTORNEYS

INVENTOR.
Marvin Neikirk,
BY Victor J. Evans & Co.
ATTORNEYS

Patented Feb. 26, 1952 2,587,510

UNITED STATES PATENT OFFICE 2,587,510

DISK CARRIER ATTACHMENT

Marvin Neikirk, Forest City, Ill.

Application June 28, 1949, Serial No. 101,867

3 Claims. (Cl. 55—73)

This invention relates to farm implements and in particular an attachment including a travelling or road wheel that may readily be mounted on the axle of a section of a disc whereby the disc may be elevated and suspended thereby in a position spaced above the ground for transportation.

The purpose of this invention is to provide a carrier for conveying a disc over the ground or on a road or highway to eliminate the necessity of transporting discs in wagons or trucks.

The usual farm disc harrow is comparatively heavy and in bringing the disc in from the field or in moving a disc from one farm to another it is not only objectionable to drag the disc over a hard surface highway or across a road or field but the thin cutting edges of the disc are damaged. To operate efficiently a disc must have sufficient weight to hold the disc in the ground and because of the excessive weight it is difficult to load a disc in a wagon or truck.

With these thoughts in mind this invention contemplates means for permanently mounting wheels on a disc whereby the disc may readily be elevated and carried by the wheels.

The object of this invention is, therefore, to provide means for mounting wheels on a disc so that the wheels do not interfere with the operation of the disc and so that the disc may be drawn upwardly to an elevated position and supported by the wheels for transportation.

Another object of the invention is to provide means for mounting wheels on a disc so that the disc may be conveyed over a highway at comparatively high speed.

Another object of the invention is to provide an attachment for applying wheels to a disc which may be installed by the average farm mechanic.

Another object of the invention is to provide an attachment providing a carrier for a disc in which means is provided for stabilizing sections of the disc.

A further object of the invention is to provide an attachment including a wheel that provides a carrier for a disc which is of a comparatively simple and economical construction.

With these and other objects and advantages in view the invention embodies a substantially U-shaped frame including means for attaching the frame to the axle of a harrow, a lever for raising the axle to an elevated position supported by the frame, means for locking the frame with the discs supported thereby, and stabilizing means for connecting sections of the disc together.

Other features and advantages of the invention will appear from the following description taken in connection with the drawings wherein.

Figures 1, 2:
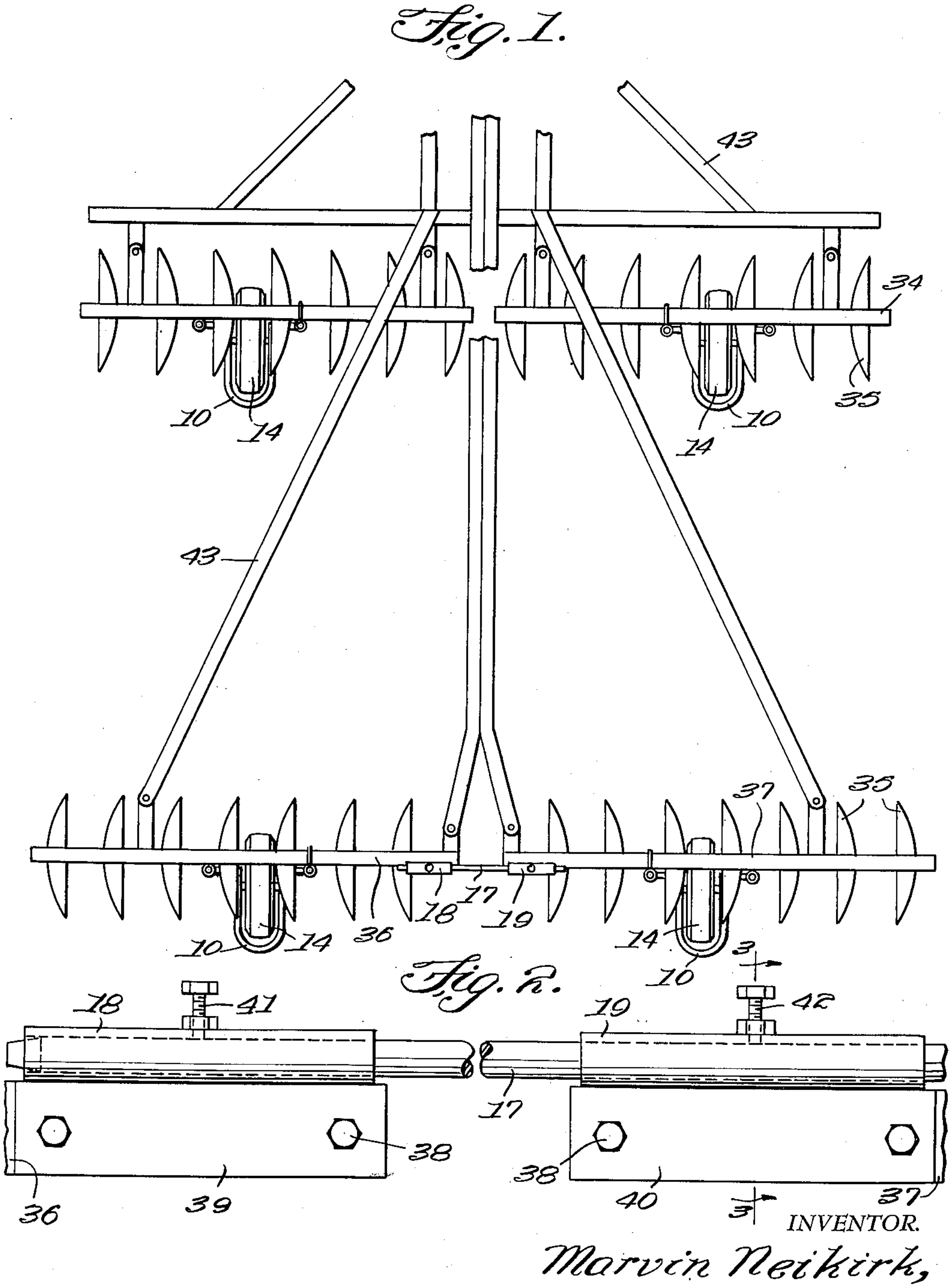
Figure 1 is a plan view of a disc harrow showing the attachment and stabilizer mounted thereon and with parts of the harrow broken away.
Figure 2 is a detail showing an elevational view illustrating a stabilizer for connecting ends of the frame of sections of the disc.

Referring now to the drawings wherein like reference characters denote corresponding parts the disc carrier attachment of this invention includes a yoke 10 having an operating bar 11 on one end, and a locking bar 12 on the other, an operating lever 13, a wheel 14, a locking sleeve 15, attaching sleeve 16 and a stabilizer including a bar 17 and tubular holding elements 18 and 19.

Figures 3, 4, 5:
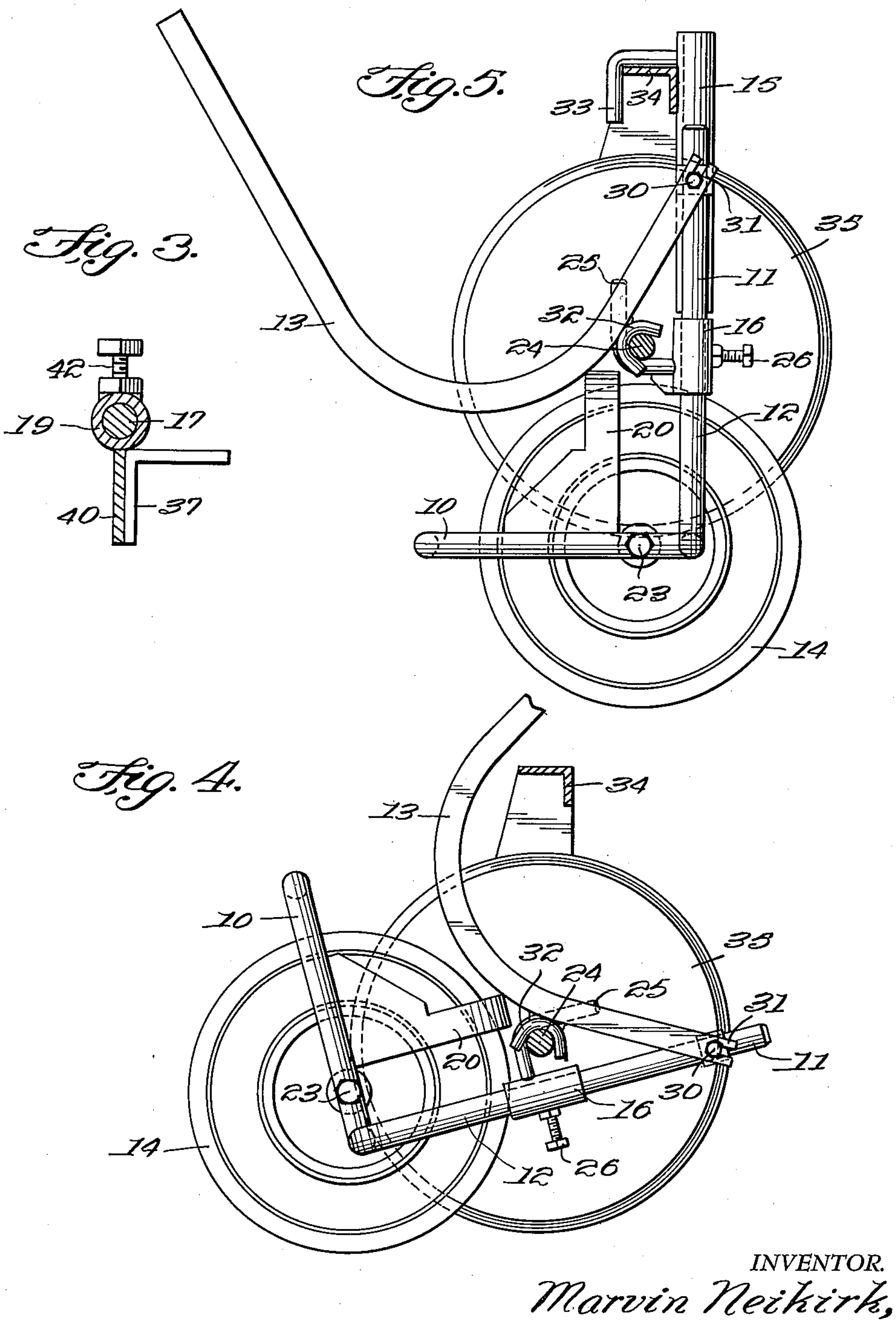
Figure 3 is a cross section through a stabilizing element shown in Figure 2 being taken on line 3—3 thereof.
Figure 4 is a detail showing a section through one of the sections of the disc illustrating the carrier attachment mounted on the axle of the disc and showing the attachment in the released or inoperative position.
Figure 5 is a similar view illustrating the position of the carrier with the disc in an elevated position.
Figure 6:
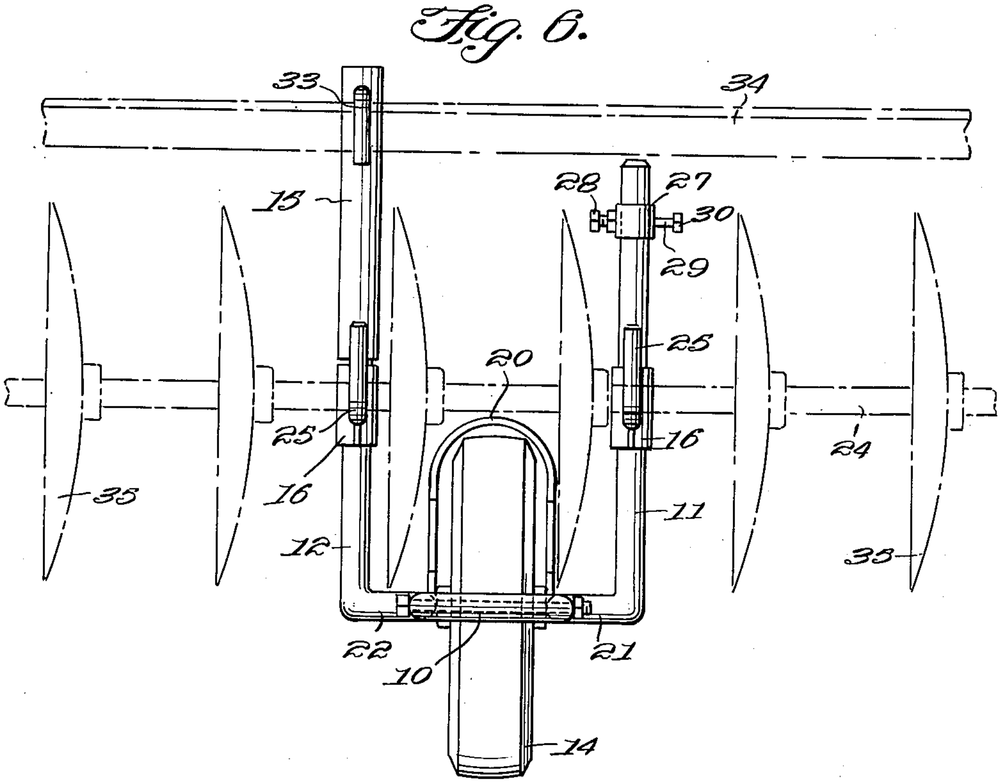
Figure 6 is an elevational view showing the attachment in the position illustrated in Figure 5 and with the parts of the disc illustrated in dot and dash lines.
Figure 8:
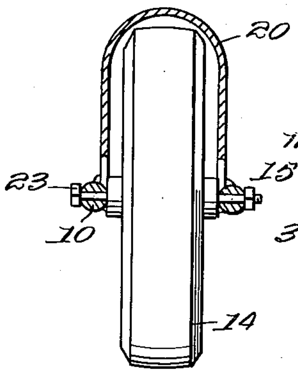
Figure 8 is a cross section through the attachment taken on line 8—8 of Figure 7 showing a plate yoke extended over the wheel.
Figures 7, 9, 10:
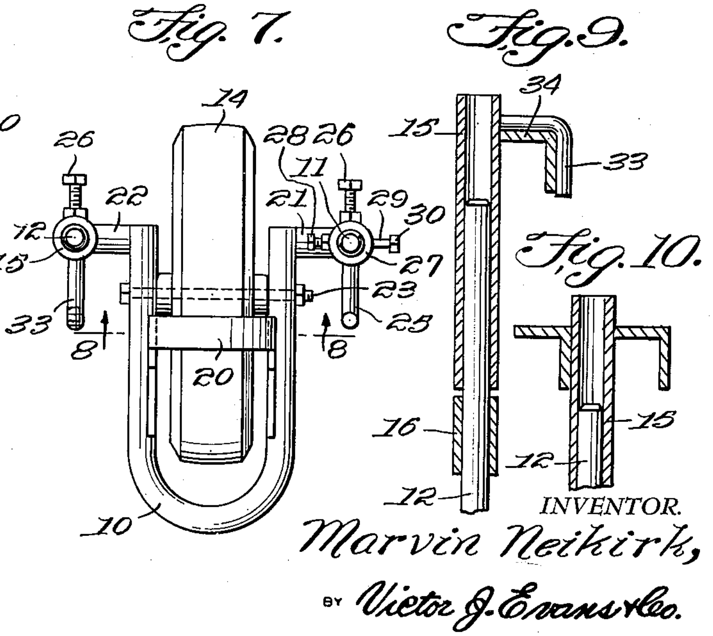
Figure 7 is a plan view of the attachment showing the device in the carrying position as illustrated in Figure 6.
Figure 9 is a detail illustrating a locking member, which is shown in section for securing the upper end of the attachment to an upper cross car of a frame of the disc.
Figure 10 is a similar detail showing the ends of the attachment positioned between angle irons.

The yoke 10 is formed of a bar bent in the form of a U with the sides or arms connected by a yoke 20 formed of a flat plate and the ends of the sides are connected to the lower ends of the bars 11 and 12 by short sections 21 and 22, respectively. The wheel 14 is journaled in the sides of the yoke 10 by a bolt 23, providing a shaft and the yoke is mounted on an axle 24 of a section of a disc by hooks 25 extended from the elements 16 and the sleeves of the elements are secured in position on the bars of the yoke by set screws 26. The upper end of the bar 11 is provided with a collar 27 that is held in position by a set screw 28 and the collar is provided with a pin 29 having a head 30 thereon. As illustrated in Figure 4 a fork 31 in the end of the lever 13 is placed over the pin 29 and with the lever positioned so that a saddle 32 on the underside thereof is positioned on the axle 24 and the extended end of the lever drawn over to the position shown in Figure 5 the axle provides a fulcrum and the fork coacting with the pin 29 elevates the extended end of the bar 11 whereby the bar assumes a vertical position as shown in Figure 5. In this position a hook 33 on the sleeve 15 is placed over a cross bar 34 of the disc frame and that extends over the discs 35 and by this means the yoke is locked with the bars 11 and 12 vertical so that the wheel 14 is positioned below the discs and the discs are supported in an elevated position thereby. With the parts in these positions the discs are suspended above the ground by the carrier attachments and in order to stabilize the sections of the discs the tubular members 18 and 19 are bolted to cross bars 36 and 37 by bolts 38 in plates 39 and 40 that extend downwardly from the tubular elements, and the ends of the rod 17 are secured in the tubular elements by the set screws 41 and 42, respectively. The discs are mounted through the axles in a frame 43.

This carrier attachment, therefore, makes it possible to readily attach devices to a disc harrow that may travel with the harrow as the harrow is used and which by drawing downwardly on a lever may be actuated to carrying positions with wheels in the attachments taking the load and with the centers of the wheels positioned behind the centers of the axles of the discs the load is taken directly on the wheels, the supporting elements being in vertical positions.

It will be understood that the yoke 10 may be formed of a round bar as illustrated in the drawings or the bar may be of any suitable shape in cross section. It will also be understood that the lever 13 may extend straight or may be bent or offset to clear parts of the disc mounting frame.

What is claimed is:

1. A disc carrier attachment comprising a yoke having arms with upwardly extended bars at the ends of the arms, a wheel rotatably mounted in the yoke, means pivotally mounting the yoke on an axle of a disc through the bars at the ends thereof, a hand lever pivotally connected to an arm of the yoke and positioned to be fulcrumed on the axle of the disc for actuating the yoke to elevate the disc with the axle of the disc extended over the center of the wheels mounted in the yokes, and means locking the parts with the disc in an elevated position and carried by the wheels.

2. A disc carrier attachment comprising a yoke having upwardly extended bars at the ends, a wheel journaled in the said yoke, means pivotally mounting the yoke on an axle of a disc through bars on the ends thereof, a lever having a saddle on the underside thereof, means connecting the lever to a bar of the yoke whereby with the saddle positioned on the axle of the disc and the lever drawn forwardly the disc will be elevated and suspended by the wheel, and means locking the parts with the disc in the elevated position.

3. In a disc harrow attachment, the combination which comprises a yoke having upwardly extended bars at the ends, a wheel journaled in the yoke, hook like elements adjustably mounted on the bars for receiving an axle of the disc, a pin adjustably mounted on one of the said bars, a lever fulcrumed on the axle of the disc and positioned to engage the pin of the bar for elevating the disc, and means on a bar of the yoke for locking the parts with the disc in the elevated position.

MARVIN NEIKIRK.

REFERENCES CITED

The following references are of record in the file of this patent:

UNITED STATES PATENTS

| Number | Name | Date |
|---|---|---|
| 1,025,767 | Waterman | May 7, 1912 |
| 1,220,485 | Ahrenholtz | Mar. 27, 1917 |
| 1,350,527 | Staley | Aug. 24, 1920 |
| 1,901,183 | McKahin | Mar. 14, 1933 |
| 2,493,230 | Dilley | Jan. 3, 1950 |